United States Patent
Ziegler et al.

(10) Patent No.: US 12,547,654 B1
(45) Date of Patent: Feb. 10, 2026

(54) LANGUAGE MODEL-GUIDED REASONING PROCESSES FOR LARGE-SCALE REASONING

(71) Applicant: Xyla Inc., Wilmington, DE (US)

(72) Inventors: Zachary Michael Ziegler, Cambridge, MA (US); Daniel Joseph Nadler, Nassau (BS)

(73) Assignee: OpenEvidence Inc., Miami, FL (US)

( * ) Notice: Subject to any disclaimer, the term of this patent is extended or adjusted under 35 U.S.C. 154(b) by 0 days.

(21) Appl. No.: 19/073,901

(22) Filed: Mar. 7, 2025

(51) Int. Cl.
*G06F 16/35* (2025.01)
*G06F 16/338* (2019.01)
*G06F 16/34* (2025.01)
*G06F 40/20* (2020.01)

(52) U.S. Cl.
CPC ........... *G06F 16/35* (2019.01); *G06F 16/338* (2019.01); *G06F 16/345* (2019.01); *G06F 40/20* (2020.01)

(58) Field of Classification Search
CPC ............ G06F 16/243; G06F 16/24542; G06F 16/248; G06F 16/285; G06F 16/3329; G06F 16/3344; G06F 16/338; G06F 16/345; G06F 16/35; G06F 16/355; G06F 16/383; G06F 16/90332; G06F 40/20; G06F 40/40; G06N 20/00; G06N 3/08
See application file for complete search history.

(56) References Cited

U.S. PATENT DOCUMENTS

| | | | | |
|---|---|---|---|---|
| 7,017,114 | B2 * | 3/2006 | Guo | G06F 40/20 715/267 |
| 10,831,793 | B2 * | 11/2020 | Aharonov | G06F 16/313 |
| 11,210,470 | B2 * | 12/2021 | Kim | G06N 3/044 |
| 11,341,203 | B2 * | 5/2022 | Jolly | G06Q 30/0282 |
| 2019/0065625 | A1 * | 2/2019 | Shinn | G06N 5/01 |
| 2019/0146970 | A1 * | 5/2019 | Chamieh | G06F 16/24524 707/718 |
| 2021/0303796 | A1 * | 9/2021 | Elsahar | G06N 3/08 |
| 2025/0077789 | A1 * | 3/2025 | Wittekind | G06F 40/30 |

OTHER PUBLICATIONS

Anil et al., "Palm 2 technical report," Paper, arXiv preprint, arXiv:2305.10403, May 17, 2023, revised Sep. 13, 2023, 93 pages.
Jiang et al., "Mistral 7B," Paper, arXiv preprint, arXiv:2310.06825, Oct. 10, 2023, 9 pages.
Touvron et al., "Llama 2: Open foundation and fine-tuned chat models," Paper, arXiv preprint, arXiv:2307.09288, Jul. 18, 2023, 77 pages.

* cited by examiner

*Primary Examiner* — Robert W Beausoliel, Jr.
*Assistant Examiner* — Cheryl M Shechtman
(74) *Attorney, Agent, or Firm* — Fish & Richardson P.C.

(57) ABSTRACT

Methods, systems, and apparatus, including computer programs encoded on a computer storage medium, for generating a response to a query. One of the methods includes receiving query data defining a query from a user; processing a network input that comprises the query data, using a language model neural network, to generate a set of planning parameters of plan to be executed by the language model neural network to generate the response to the query from the user; executing the plan defined by the set of planning parameters using the language model neural network; and generating, using the language model neural network, and based on the data extracted from the documents classified as being relevant to the query, a response to the query.

20 Claims, 7 Drawing Sheets

502 — How does IL-6 contribute to common neurodegenerative disease?

504
- Generate plan
- Filter for studies where the paper discusses IL-6.
- Filer for studies where the paper discusses neurodegenerative dise
- Extract disease using query: "What neurodegenerative disease(s) is
- Extract role using query: "What role does IL-6 play in the neurodeg...
- Cluster by disease
- For each group, generate a summary
- Complete analysis

506

Interleukin-6 (IL-6) plays a significant and multifaceted role in the patho neurodegenerative diseases, contributing to both deceases progression ar potential neuroprotective effects. The involvement of IL-6 in these diseases a target for therapeutic intervention and as a biomarker for disease prog In Alzheimer's disease (AD), IL-6 is associated with elevated serum and c correlating with disease severity and dementia.[1] It contributes to neuro associated with inflammation relevant to AD pathology, and regulates synapi learning. [2-4] Interestingly, IL-6 also exhibits neuroprotective effects by pi neurotrophic factors and neuronal survivor.[5] However, its role as a proir neuroinflammation and its involvement in stress response and neurotx Its action in AD.[6-8] The suppression of IL-6 production or signaling has eutic strategy for AD.[9-10]

In Parkinson's disease (PD), IL-6's roles are primarily associated with ... e modulation. Increased IL-6 gene expression in PD patient sug ... s progression.[11] It acts as a proinflammatory cytokine in neuroir ... entions targeting IL-6 and related pathwaysshowing potential in r ...

Frontotemporal Dementia (FTD) and Lewy body disease also see IL-6 im IL-6 contributes to neuroinflammation through glial cell activation, whil ...

FIG. 5A

LANGUAGE MODEL-GUIDED REASONING PROCESSES FOR LARGE-SCALE REASONING

BACKGROUND

This specification relates to language model-guided processes for large-scale reasoning. A language model is a type of a machine learning model.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a reasoning system implemented as computer programs on one or more computers in one or more locations that receives a query and uses neural networks and other components of the system to generate a response to the query.

To generate the response, the reasoning system executes a reasoning process to reason over a knowledge base, e.g., a scientific database that stores scientific documents. The reasoning process includes a filtering operation, an extracting operation, a grouping operation, and a summarization operation.

Throughout this specification, a "computing unit" may be, e.g., a computer, a core within a computer having multiple cores, or other hardware or software, e.g., a dedicated thread, within a computer capable of independently perform operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units may be different types of computing units. For example, one computing unit may be a CPU while other computing units may be GPUs.

According to an aspect, there is provided a method performed by one or more computers, the method comprising: receiving query data defining a query from a user; processing a network input that comprises the query data, using a language model neural network, to generate a set of planning parameters of plan to be executed by the language model neural network to generate a response to the query from the user, wherein the set of planning parameters define at least: (i) a filtering criterion for filtering a set of documents to identify documents relevant to the query; and (ii) a set of fields to be extracted from each document that has been identified to be relevant to the query; executing the plan defined by the set of planning parameters using the language model neural network, comprising: classifying, for each document in a set of documents, whether the document is relevant to the query based on the filtering criterion generated by the language model neural network; and extracting, from each document that is classified as being relevant to the query, data relevant to each field in the set of fields generated by the language model neural network; and generating, using the language model neural network, and based on the data extracted from the documents classified as being relevant to the query, a response to the query.

The set of documents may be stored in a knowledge base external to the language model neural network.

The set of planning parameters may identify one or more fields in the set of fields based on which documents that have been identified to be relevant to the query should be clustered. Executing the plan defined by the set of planning parameters may further comprise: generating one or more document clusters each comprising one or more documents based on one or more defined fields.

Generating the one or more document clusters may comprise generating the one or more document clusters using the language model neural network.

The set of planning parameters may define a respective summarization instruction for each document cluster in the one or more document clusters. Executing the plan defined by the set of planning parameters may further comprise: generating, using the language model neural network and for each document cluster in the one or more document clusters, a respective summary for the document cluster based on processing the respective summarization instruction for the document cluster and at least a portion of each of the one or more documents included in the document cluster.

Generating, using the language model neural network and for each document cluster in the one or more document clusters, the respective summary for the document cluster may comprise processing, by the language model neural network, the data extracted from each document included in the document cluster.

The respective summary for the document cluster may include, for each of one or more documents included in the document cluster, a citation indicator that identifies the document.

Generating the response to the query may comprise processing, by the language model neural network, the respective summary for each document cluster in the one or more document clusters.

Receiving the query data defining the query from the user may comprise receiving the query from the user and by way of a user interface presented to the user on a display of a user device. The method may further comprise: presenting, by way of the user interface and on the display of the user device, the response to the query.

According to another aspect, there is provided one or more computer-readable storage media encoded with instructions that, when executed by one or more computers, cause the one or more computers to perform the operations of the above method aspects.

According to a further aspect, there is provided a system comprising one or more computers and one or more storage devices storing instructions that when executed by one or more computers cause the one or more computers to perform the respective operations of the above method aspects.

The subject matter described in this specification can be implemented in particular embodiments so as to realize one or more of the following advantages.

Using some techniques described in this specification, a reasoning system can allow a language model neural network to be used as both a planner and an executor, i.e., to be used both to generate a plan for a reasoning process and to execute the reasoning process in accordance with the plan to extract data from a knowledge base.

Relative to having a separate planner and executor, having a single model that can function as both a planner and an executor allows for the reasoning process to be effectively executed in a computational resource efficient manner. The reasoning system can generate the plan for the reasoning process with much less additional latency and while consuming much less additional memory and network bandwidth resource relative to generating the plan for the reasoning process using a separate planner.

Some techniques described in this specification can improve the precision and recall metrics of the reasoning process by leveraging the knowledge learned by the language model from its large-scale pre-training. When executed in accordance with a plan that is defined by the planning parameters—for example parameters that define the ways in which the filtering, extraction, grouping, and summarization operations included in the reasoning process should be performed—generated as outputs by the language model, the reasoning process can extract high quality data (e.g., data with high relevancy, comprehensiveness, accuracy, up-to-dateness, etc.) from an external knowledge base.

The data extracted by the reasoning process, in turn, enables the reasoning system to generate a response to a query using the language model and up-to-date information included in the extracted data. That is, using techniques described in this specification, the reasoning system can generate responses that are timely, scientifically reliable, and factually accurate. Notably, because the reasoning process is executed to extract such information, re-training the language model on updated training data is not needed.

The reasoning system is particularly advantageous in various applications—for example scientific or academic research applications and drug discovery applications—in which factual accuracy, reliability, and interpretability are desirable. For example, the reasoning system can function as an interactive tool that allows for semantic searches, allowing users to find an exact precise set of relevant documents, and only those documents, from a knowledge base storing a prohibitively large corpus of documents that is too large to be exhaustively searched by using a conventional semantic search engine.

The reasoning system can utilize parallelism for some or all of the filtering, extraction, grouping, and summarization operations included in the reasoning process. That is, parts of the reasoning process can be performed in parallel in order to reduce latency and increase computational efficiency. For example, the documents in the knowledge base can be split into partitions across a group of computing units that operate independently and substantially in parallel to perform the filtering, extraction, grouping, and summarization operations.

When performed in parallel, each of the computing units can maintain a local copy of the partition of data partition that can be used to execute the filtering, extraction, grouping, and summarization operations in parallel with each other computing unit. The reasoning system is fault tolerant, so if a single computing unit fails, the tasks assigned to that computing unit can be reallocated to other computing units without restarting the process of answering the query. By utilizing load balancing techniques, the reasoning system can automatically balance the computational load across the computing units, preventing any single computing unit from becoming overwhelmed.

From another aspect, the reasoning process described in this specification provides an effective solution to the parallelization problem of language model-guided processes for large-scale reasoning. That is, the described reasoning process makes it more practically possible to parallelize various operations involved in the reasoning process to shorten the overall execution time. The modularized nature of the reasoning process allows parallelization in way that is not possible with conventional approaches that involve repeatedly prompting a language model neural network with different prompts that each include a set of documents and a query.

Conventionally, the computational complexity of running a language model on a prompt can increase quadratically with the size of the prompt, which can cause processing large prompts to rapidly become computationally infeasible. The autoregressive nature of how a language model generates an output serially, one token at a time in an autoregressive way, also makes parallelization challenging in conventional approaches.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-C are illustrations of operations performed by a reasoning system for generating example responses to example queries.

Like reference numbers and designations in the various drawings indicate like elements.

SUMMARY

Figure 1:
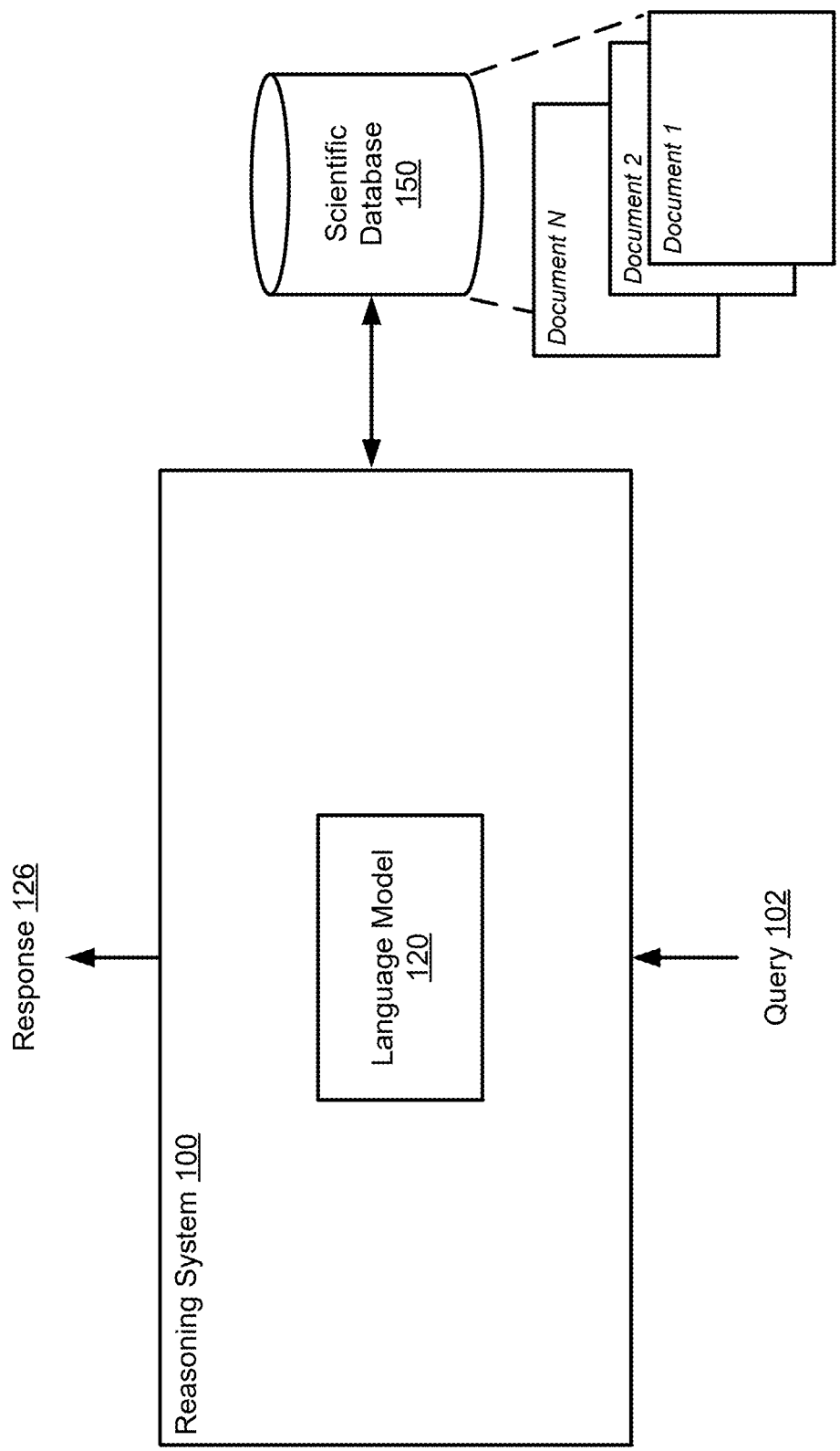
FIG. 1 is a diagram of an example reasoning system.

FIG. 1 shows an example reasoning system 100. The reasoning system 100 is an example of a system implemented as computer programs on one or more computers in one or more locations that receives a query 102 and uses neural networks and other components of the system to generate a response 126 to the query based on external knowledge.

The reasoning system 100 can obtain data representing the query 102 in any of a variety of ways. In some cases, the data representing the query 102 is also called "query data." In some cases, the query 102 is also called a "question," or a "prompt," or a "request."

In some cases, the query data includes text data, and the reasoning system 100 receives the query data as a text query from a user submitted through a user interface of a user device. For example, the query 102 may be entered by the user by typing using a data input device, e.g., a keyboard, a touch screen, a wearable device (such as a smartwatch), a smart home device (such as a smart speaker), or another handheld or desktop input device.

In some other cases, the query data includes audio data, and the reasoning system 100 receives the query data as a natural language speech query from the user and converts the speech into the query 102 by applying a speech recognition engine to the speech. For example, the query 102 may be received in the form of a sound (speech) signal, captured by a microphone of the user computer, which is converted by a speech recognition engine, i.e., a speech-to-text converter to form the query 102.

Once the reasoning system 100 has generated the response 126, the reasoning system 100 can provide the response 126 to the user. For example, in some implementations, the reasoning system 100 can provide the response for presentation in the user interface that is presented on the display of the user device, e.g., the user device through which the user submitted the query data.

As another example, in some implementations where the reasoning system 100 is implemented as part of or in communication with a digital assistant device, e.g., a mobile device, a smartwatch or other wearable device, or a smart speaker device, the digital assistant device can provide the response to the user, e.g., by generating speech representing the response and playing back the speech to the user over a speaker.

The reasoning system 100 has access to a scientific database 150. The scientific database 150 can be any database that stores a corpus of scientific documents that collectively represent an external knowledge base that is available for the reasoning system 100 to use in order to generate a response 126 with a high quality (e.g., high relevancy, comprehensiveness, accuracy, up-to-dateness, etc.).

A scientific document is an electronic document that includes scientific content. Examples of scientific documents include papers, articles, abstracts, or other documents from scientific, medical, or academic journals, periodicals, or other publications. The scientific documents can be stored in any electronic document format, e.g., as webpages, word processing documents, presentation slides, spreadsheets, portable document format (PDF) documents, images, or feed sources.

In practice, the scientific database 150 can include vast numbers of scientific documents, e.g., at least 100,000 scientific documents, or at least 1,000,000 scientific documents, or at least 10,000,000 scientific documents. Moreover, the scientific database 150 can dynamically change over time, e.g., as new scientific documents are added, or as scientific documents are removed (e.g., as newer versions of the papers replace old ones, or as newer issues of the journals are released, etc.).

The reasoning system 100 generates the response 126 by first executing a reasoning process to reason over the scientific database 150 and then executing an output process to generate the response 126 based on data that is generated as a result of the reasoning process. The reasoning process includes a filtering operation, an extraction operation, a grouping operation, and a summarization operation. The data generated as a result of the reasoning process includes data that is generated by the summarization operation.

In particular, the reasoning process is guided by a plan that is defined by the outputs of a language model neural network 120 (or "language model 120" for short). Moreover, the response 126 is generated as output by the same language model 120 based on processing an input that includes the data that is generated as a result of the reasoning process. Thus, the reasoning system 100 uses the same language model 120 to both execute the reasoning process and generate the response 126.

The language model 120 can be any neural network that has been configured through training to enable it to receive an input sequence made up of tokens selected from a vocabulary and auto-regressively generates an output sequence made up of tokens from the vocabulary.

For example, during the reasoning process, the input sequence can include natural language text that represents the query 102, while the output sequence can include a set of planning parameters that represent a plan that specifies how the reasoning process can be executed.

As another example, during the output process, the input sequence can include natural language text that represents the query 102 and the data that is generated as a result of the reasoning process, while the output sequence can include natural language text that represents the response 126 to the query.

The vocabulary of tokens can include any of a variety of tokens that represent text symbols or other symbols. For example, the vocabulary of tokens can include one or more of characters, sub-words, words, punctuation marks, numbers, or other symbols that appear in a corpus of natural language text.

For example, the language model 120 can have any of a variety of Transformer-based neural network architectures, e.g., encoder-only Transformer architectures, encoder-decoder Transformer architectures, decoder-only Transformer architectures, other attention-based architectures, and so on. As another example, the language model 120 can have any of a variety of recurrent neural network architectures.

Example implementations of such a language model are described in more detail in Anil, Rohan, et al. "Palm 2 technical report." arXiv preprint arXiv: 2305.10403; and Touvron, Hugo, et al. "Llama 2: Open foundation and fine-tuned chat models." arXiv preprint arXiv: 2307.09288 (2023), Jiang, Albert Q., et al. "Mistral 7B." arXiv preprint arXiv: 2310.06825 (2023), but others may also be used.

More specifically, the auto-regressively generated output sequence is created by generating each particular token in the output sequence conditioned on a current input sequence that includes any tokens that precede the particular text token in the output sequence, i.e., the tokens that have already been generated for any previous positions in the output sequence that precede the particular position of the particular token, and the tokens included in the input sequence.

To generate a particular token at a particular position within an output sequence, the language model 120 can process the current input sequence to generate a score distribution, e.g., a probability distribution, that assigns a respective score, e.g., a respective probability, to each token in the vocabulary of tokens. The language model 120 can then select, as the particular token, a token from the vocabulary using the score distribution. For example, the neural network of the language model 120 can greedily select the highest-scoring token or can sample, e.g., using nucleus sampling or another sampling technique, a token from the distribution.

The language model 120 can have been trained using a two-step process: a pre-training step, followed by a fine-tuning step. During the pre-training step, the language model 120 can have been pre-trained, e.g., by the reasoning system 100 or a separate training system, on a language modeling task, e.g., a next token prediction task that requires predicting, given a current sequence of text tokens, the next token that follows the current sequence in the training data.

As a particular example, the language model 120 can have been pre-trained on a maximum-likelihood objective on a large dataset of text, e.g., text that is publicly available from the Internet or another text corpus. Pre-training on massive amounts of textual data endows the language model 120 with general reasoning capabilities, e.g., including the capability to generate, in response to a prompt that includes a sequence of text tokens, an output that includes another sequence of text tokens.

During the fine-tuning step, the pre-trained language model 120 is then fine-tuned, i.e., further trained, through fine-tuning adaptation for use by the reasoning system 100 to perform the reasoning process. Examples of fine-tuning adaptation technique include reinforcement learning from human feedback (RLHF), reinforcement learning from AI feedback (RLAIF), prompt tuning, instruction tuning, and the like.

As a particular example, the language model 120 can have been trained by reinforcement learning from human feedback (RLHF), where the human users can provide feedback that rates the quality of the responses generated by the language model 120, and then this feedback is used to train a reward model to generate reward scores based on further responses generated by the language model 120, which can be used as training signals (in lieu of human feedback) for adjusting the parameters of the language model 120 beginning from their pre-trained values. Additionally or alternatively, the human users can provide feedback that rates the quality (e.g., completeness, practicality, length, etc.) of the plans, which are represented by the planning parameters generated by the language model 120, and then this feedback is used to train a reward model to generate reward scores based on further planning parameters generated by the language model 120.

Figure 2:
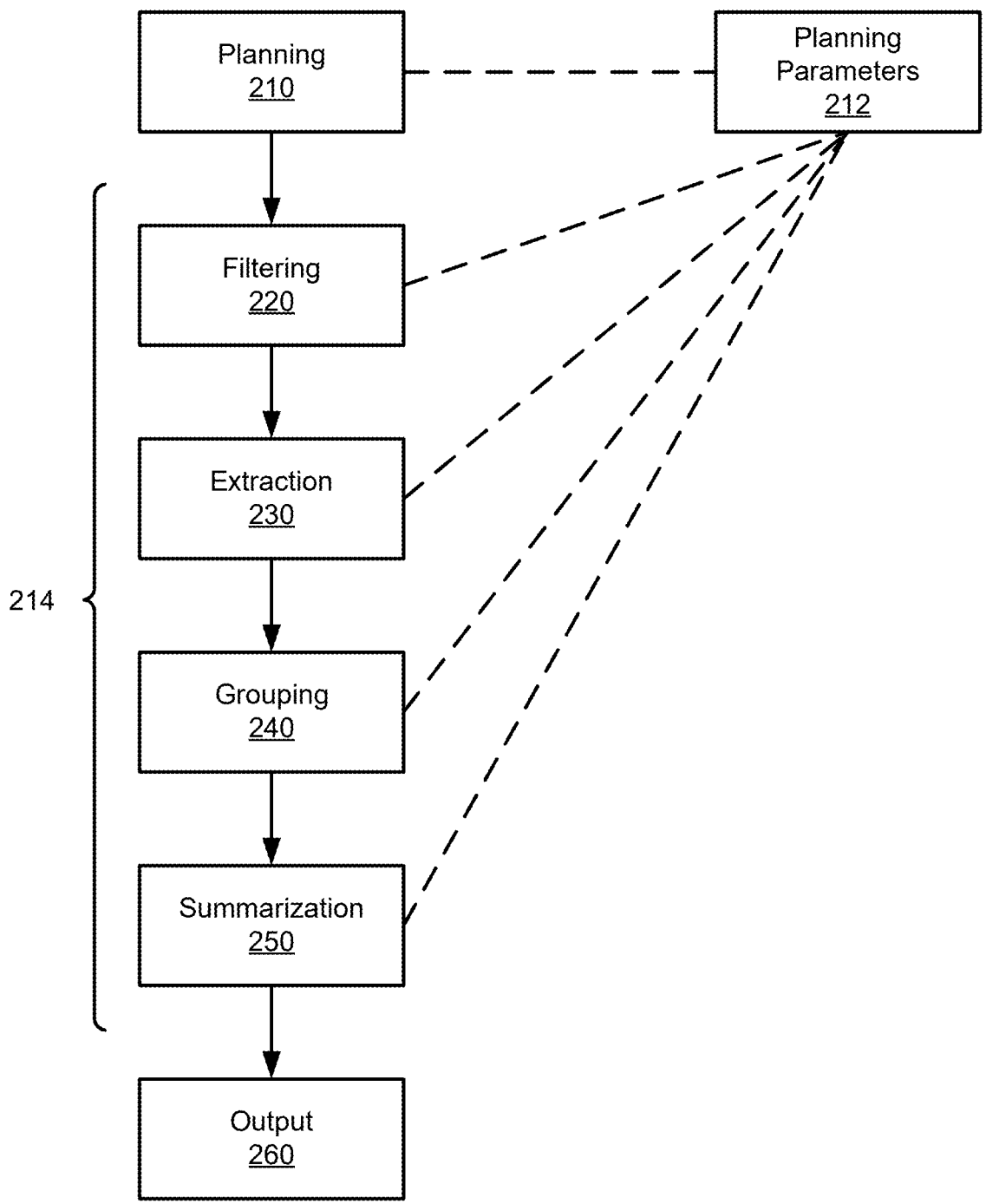
FIG. 2 is an illustration of example operations performed by a reasoning system.

FIG. 2 is an illustration of example operations performed by the reasoning system 100 of FIG. 1. The operations include operations performed during a planning process 210, followed by operations performed during a reasoning process 214, and followed by an output process 260. The operations performed during the reasoning process 214 includes a filtering operation 220, followed by an extraction operation 230, followed by a grouping operation 240, and followed by a summarization operation 250.

During the planning process 210, the reasoning system 100 uses the language model 120 to generate a plan for the reasoning process that follows the planning process 210. The language model 120 can generate the plan by generating a set of planning parameters 212 that define the specifics of the plan.

To generate the set of planning parameters 212, the reasoning system 100 can provide a network input to the language model 120 and then cause the language model 120 to process each of the network input to generate one or more outputs that include or otherwise specify these parameters.

For example, the reasoning system 100 can provide a network input that includes (i) the query 102, (ii) a natural language instruction to generate the planning parameters, and (iii) a natural language explanation of what the planning parameters are and how they will be used.

The set of planning parameters 212 can include parameters that define a filtering criterion for filtering the scientific documents stored in the scientific database 150 to identify scientific documents that are relevant to the query 102. Note that during the planning process 210, the reasoning system 100 does not actually perform the filtering operation; instead, the filtering operation will be performed as part of the reasoning process 214, which takes place after the planning process 210 is completed, as discussed later.

In some implementations, the filtering criterion can be defined in some natural language. For example, a filtering criterion can be in the form of: "A document is relevant to answering the query if it describes a medical study that characterizes side effects of statins in obese men over the age of 50."

The set of planning parameters 212 can include parameters that define a set of fields or attributes to be extracted from each scientific document that has been identified to be relevant to the query 102. In some implementations, each field has a name. An example of this is a field which has the name of "laboratory mice." In some implementations, each field has a description. An example of this is a field which has the description of "types of mice used in a study." In some implementations, each field has both a name and a description. As similarly mentioned above, during the planning process 210, the reasoning system 100 does not actually perform the extraction operation; instead, the extraction operation will be performed as part of the reasoning process 214, which takes place after the planning process 210 is completed, as discussed later.

In some implementations, each parameter directly defines a corresponding field in the set of fields, e.g., a parameter can be the name or description of a field. In some other implementations, each parameter indirectly defines a corresponding field in the set of fields, e.g., a parameter can be an identifier that maps to a corresponding field according to a predefined mapping between identifiers and field names/descriptions.

The set of planning parameters 212 can include parameters that identify one or more fields in the set of fields based on which the scientific documents that have been identified to be relevant to the query 102 should be clustered or grouped together. As similarly mentioned above, during the planning process 210, the reasoning system 100 does not actually perform the grouping operation; instead, the grouping operation will be performed as part of the reasoning process 214, which takes place after the planning process 210 is completed, as discussed later.

The set of planning parameters 212 can include parameters that define a respective summarization instruction for each document cluster in one or more document clusters once they are generated as a result of the grouping operation. Each document cluster, once generated, will include one or more relevant scientific documents that have been clustered into a group based on the one or more fields defined by the planning parameters 212. As similarly mentioned above, during the planning process 210, the reasoning system 100 does not actually perform the summarization operation; instead, the summarization operation will be performed as part of the reasoning process 214, which takes place after the planning process 210 is completed, as discussed later.

For each document cluster, the summarization instruction defines how the scientific document included in the document cluster should be summarized. For example, a parameter can define the maximum number of words allowed in the summary for the document cluster.

As another example, a parameter can define whether the summary is an extractive summary or an abstractive summary. In contrast to extractive summary which merely copies informative fragments from the scientific documents, abstractive summary may include novel words that do not appear in the scientific documents.

As another example, a parameter can define whether citation indicators should be included in the summary for the document cluster. A citation indicator can identify a source scientific document based on which a corresponding portion of the summary is generated.

Having performed the planning process 210 to generate the set of planning parameters 212 that define the specifics of the plan, the reasoning system 100 moves onto the reasoning process 214. The operations performed during the reasoning process 214 includes a filtering operation 220, followed by an extraction operation 230, followed by a grouping operation 240, and followed by a summarization operation 250.

During the filtering operation 220, the reasoning system 100 classifies, for each scientific document stored in the scientific database 150, whether the scientific document is relevant to the query 102. In other words, the reasoning system 100 determines which scientific documents stored in the scientific database 150 are relevant to the query 102, and which scientific documents stored in the scientific database 150 are irrelevant to the query 102.

There are many ways in which the filtering operation 220 can be performed based on the filtering criterion defined by the planning parameters 212 generated by the language model 120 during the planning process 210.

In some implementations, the reasoning system 100 uses the language model 120 to perform the filtering operation. For example, for each of one or more scientific documents stored in the scientific database 150, the reasoning system 100 can provide an input that includes (i) the filtering criterion, (ii) the scientific document to the language model 120, and optionally, (iii) a natural language instruction for classification, and then cause the language model 120 to process the input to generate an output that includes a parameter that defines whether the scientific document is relevant to the query 102, i.e., that classifies whether or not the scientific document satisfies the filtering criterion.

In some of these implementations, the parameter is a binary value, e.g., true or false, of whether the scientific document is relevant to the query 102. In these implementations, a scientific document for which a true value is generated can be classified as being relevant to the query 102.

In some others of these implementations, the parameter is a confidence value between 0 and 1 that represents a likelihood that the scientific document is relevant to the query 102. In these implementations, a scientific document for which a confidence value that is greater than a confidence threshold is generated can be classified as being relevant to the query 102.

In some implementations, instead of using the language model 120, the reasoning system 100 uses one or more embedding models to facilitate the filtering operation. For example, the reasoning system 100 can use a filtering criterion embedding model to embed the filtering criterion into a filtering criterion embedding, and a document embedding model to embed the scientific document into a document embedding, and then assess that the scientific document is relevant to the query if the distance (e.g., a Euclidean distance or another distance measure) between the filtering criterion embedding and document embedding is less than a threshold distance.

In these implementations, the filtering criterion embedding model and the document embedding model, which can be either the same as or different from the filtering criterion embedding model, can each be configured as a neural network, e.g., that includes one or more fully connected layers, one or more attention layers, or one or more other layers.

For example, the filtering criterion embedding model and the document embedding model can have been trained on filtering criterion-scientific document pairs selected from a set of training data as part of a machine learning training technique to train the embedding models based on a gradient descent with backpropagation training technique to optimize a contrastive loss that pushes the embeddings generated from each filtering criterion-scientific document pair closer together in a co-embedding space, i.e., reduces the distance between the filtering criterion embedding and the document embedding generated by the filtering criterion embedding model and the document embedding model from the filtering criterion and the scientific document in each pair, respectively, while pushing the embeddings generated from the filtering criteria and scientific documents across different pairs (e.g., within a same batch of filtering criterion-scientific document pairs sampled from the set of training data) apart in the co-embedding space.

During the extraction operation 230, the reasoning system 100 extracts, from each scientific document that is classified as being relevant to the query 102, data relevant to each field in the set of fields that are defined by the planning parameters 212 generated by the language model 120.

The extracted data can include the data values for each field that appear in a relevant scientific document. In the example of a field which has the name of "laboratory mice," the extracted data can include different data values for the "laboratory mice" field that are mentioned in a relevant scientific document, e.g., "transgenic mice," "mutant mice," "obese mice," "nude mice," "fluorescent mice," and so forth.

During the grouping operation 240, the reasoning system 100 generates one or more document clusters based on the one or more fields defined by set of planning parameters 212. Each document cluster includes a subset of the scientific documents that are classified as being relevant to the query 102.

In some implementations, the subsets of scientific documents are non-overlapping subsets. That is, a scientific document is included in one and only one document cluster. In some other implementations, the subsets of relevant scientific documents may partially overlap. That is, the same scientific document is included in two or more different document clusters.

For example, for each relevant scientific document, the planning parameters 212 can identify one or more fields, which may or may not be the same as the fields identified for another relevant scientific document. When the one or more fields generated for two relevant scientific documents include a same or similar (e.g., synonymically related or semantically similar) field, then the two relevant scientific documents can be grouped by the reasoning system 100 into a same cluster that corresponds to the same or similar field. In this manner, each document cluster includes a group of scientific documents having data values for the same or similar field that corresponds to the document cluster.

There are many ways in which the grouping operation 240 can be performed based on the one or more fields defined by set of planning parameters 212 for each relevant scientific document.

In some implementations, the reasoning system 100 can use a clustering algorithm to process each scientific document that is classified as being relevant to the query 102 and the one or more fields defined by the parameters for the scientific document, and to assign the scientific document to one or more document clusters. For example, the clustering algorithm can be a k-means algorithm or an expectation maximization algorithm.

In some implementations, for each scientific document that is classified as being relevant to the query 102, the reasoning system 100 can use the language model 120 to process an input that includes the relevant scientific document and the one or more fields defined by the parameters for the scientific document, to generate an output that assigns the relevant scientific document to one or more document clusters, e.g., an output that includes a respective score for each of the one or more document clusters.

During the summarization operation 250, the reasoning system 100 generates, for each document cluster in the one or more document clusters, a respective summary for the document cluster. This can be done based on processing, using the language model 120, an input that includes (i) the respective summarization instruction for the document cluster, (ii) at least a portion of each of the one or more scientific documents included in the document cluster, and (iii) the data extracted from each scientific document included in the document cluster, to generate an output that includes the summary for the document cluster.

A "summary" for a document cluster may be in the form of a natural language sequence that is shorter than any of the scientific document included in the document cluster but summarizes the scientific documents included in the document cluster, e.g., represents the most important or relevant information within the scientific documents. From another aspect, the summary represents a topic of the document cluster.

In some cases, a summary for a document cluster includes one or more citation indicators. Each citation indicator can identify a source scientific document based on which a corresponding portion of the summary is generated. The source scientific document can be any scientific document in the one or more scientific documents included in the document cluster.

Having performed the reasoning process 214 in accordance with the plan defined by the set of planning parameters 212, the reasoning system 100 moves onto the output process 260. In other words, the output process 260 is performed after the planning process 210 and after the reasoning process 214.

During the output process 260, the reasoning system 100 uses the language model 120 to actually generate the response 126 to the query 102. This can be done based on processing, using the language model 120, an input that includes (i) the respective summary for each document cluster in the one or more document clusters and (ii) the query 102, to generate an output that includes the response 126.

Optionally, the input includes at least a portion of each of the one or more scientific documents included in each document cluster. Optionally, the input includes the data extracted from each scientific document included in each document cluster. Optionally, the input includes a predetermined set of system instructions. For example, the predetermined set of system instructions can be represented by text in some natural language, e.g., text that describes what may or may not be included in the answer 126.

Figure 3:
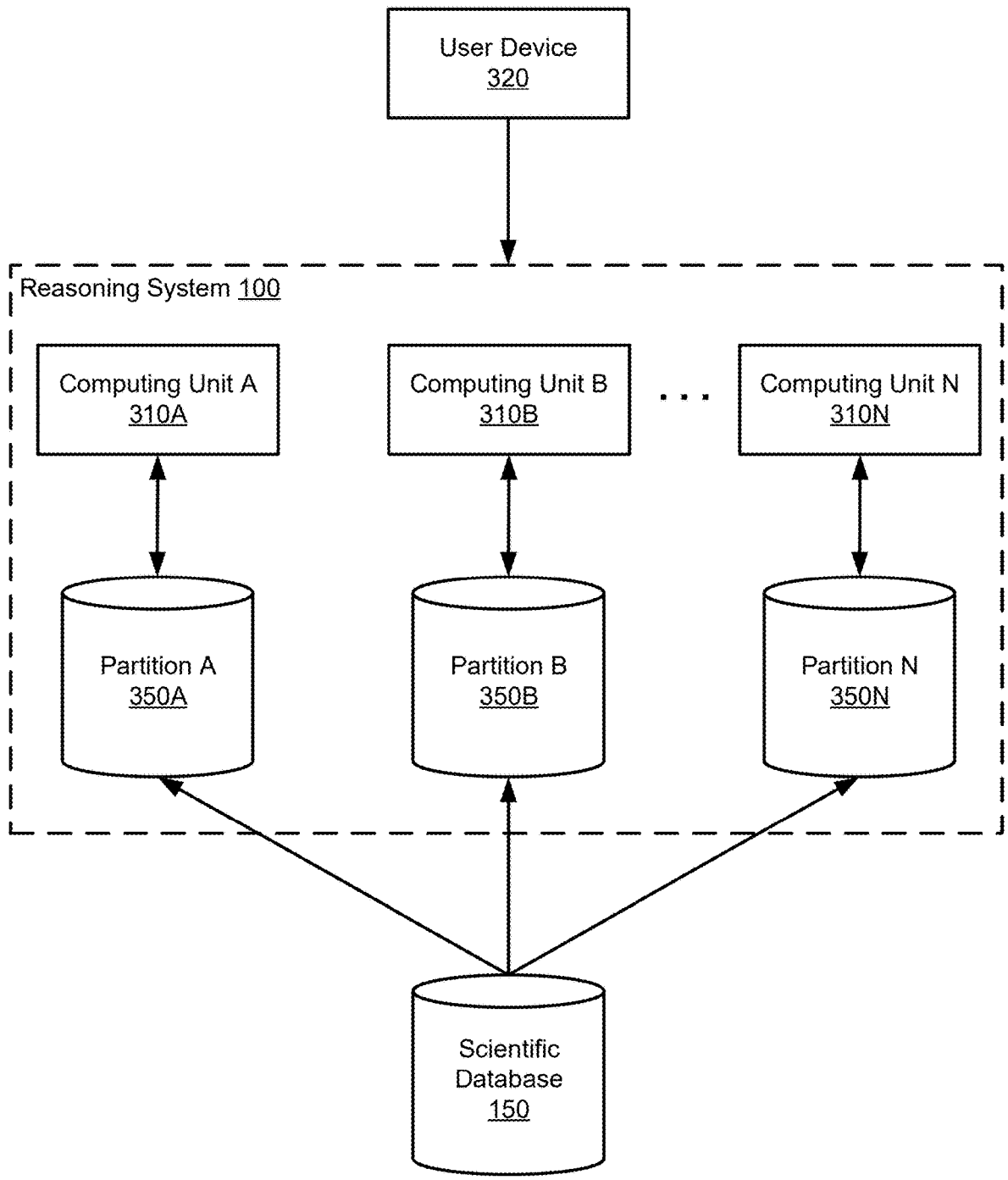
FIG. 3 is a diagram of an example implementation of the reasoning system.

FIG. 3 is a diagram of an example implementation of the reasoning system 100 of FIG. 1. In the example of FIG. 3, the reasoning system 100 is implemented as a parallel computing system that includes a plurality of computing units. Thus, as illustrated, the reasoning system 100 includes computing units 310A, 310B, through 310N. The computing units 310A-310N are communicatively coupled by one or more communications networks, e.g., a local area network or the Internet.

The reasoning system 100 is configured to receive a query 102 from a user device 320. The reasoning system 100 can divide the reasoning process to be performed in response to the query 102 among the computing units 310A-310N. The reasoning system 100 can also assign each computing unit to operate on a partition (or chunk) of data stored in the scientific database 150. Each data partition corresponds a subset of the scientific documents stored in the scientific database 150, which is accessible to a corresponding one of the plurality of computing units in the reasoning system 100.

Thus, as illustrated, as part of the reasoning process performed in response to query 102, the computing unit 310A operates on data partition A 350A, the computing unit 310B operates on data partition B 350B, and the computing unit 310N operates on data partition N 350N. The data partitions 350A-350N correspond to smaller, potentially non-overlapping, subsets of the scientific documents stored in the scientific database 150.

In this example implementation, the reasoning system 100 can utilize parallelism for some or all of the filtering, extraction, grouping, and summarization operations included in the reasoning process in order to reduce latency and increase computational efficiency. For example, in FIG. 3, each computing unit 310A-310N can operate independently and substantially in parallel with other computing units to perform the filtering operation and extraction operation and, in some implementations, the grouping operation or summarization operation or both (e.g., in implementations where the data partitions correspond to different topics or fields), on the data partition 350A-350N that is accessible to the computing unit.

Figure 4:
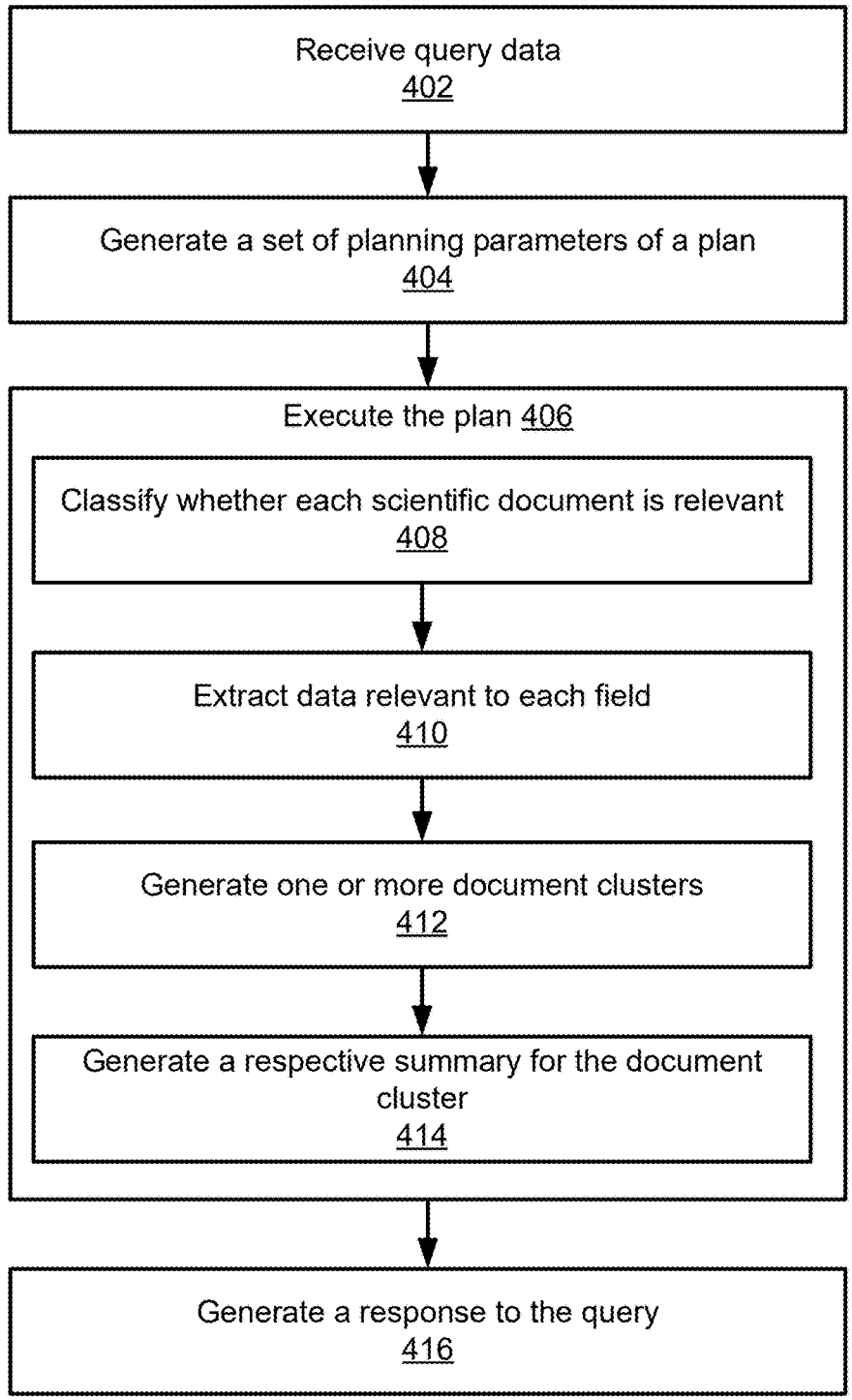
FIG. 4 is a flow diagram of an example process for generating a response to a query.

FIG. 4 is a flow diagram of an example process 400 for generating a response to a query. For convenience, the process 400 will be described as being performed by a system of one or more computers located in one or more locations. For example, a reasoning system, e.g., the reasoning system 100 of FIG. 1, appropriately programmed in accordance with this specification can perform the process 400. The reasoning system has access to a scientific database that stores a corpus of scientific documents. FIG. 4 is described in conjunction with FIGS. 5A-C, which are illustrations of operations performed by the reasoning system 100 for generating example responses to example queries.

Figure 5B:
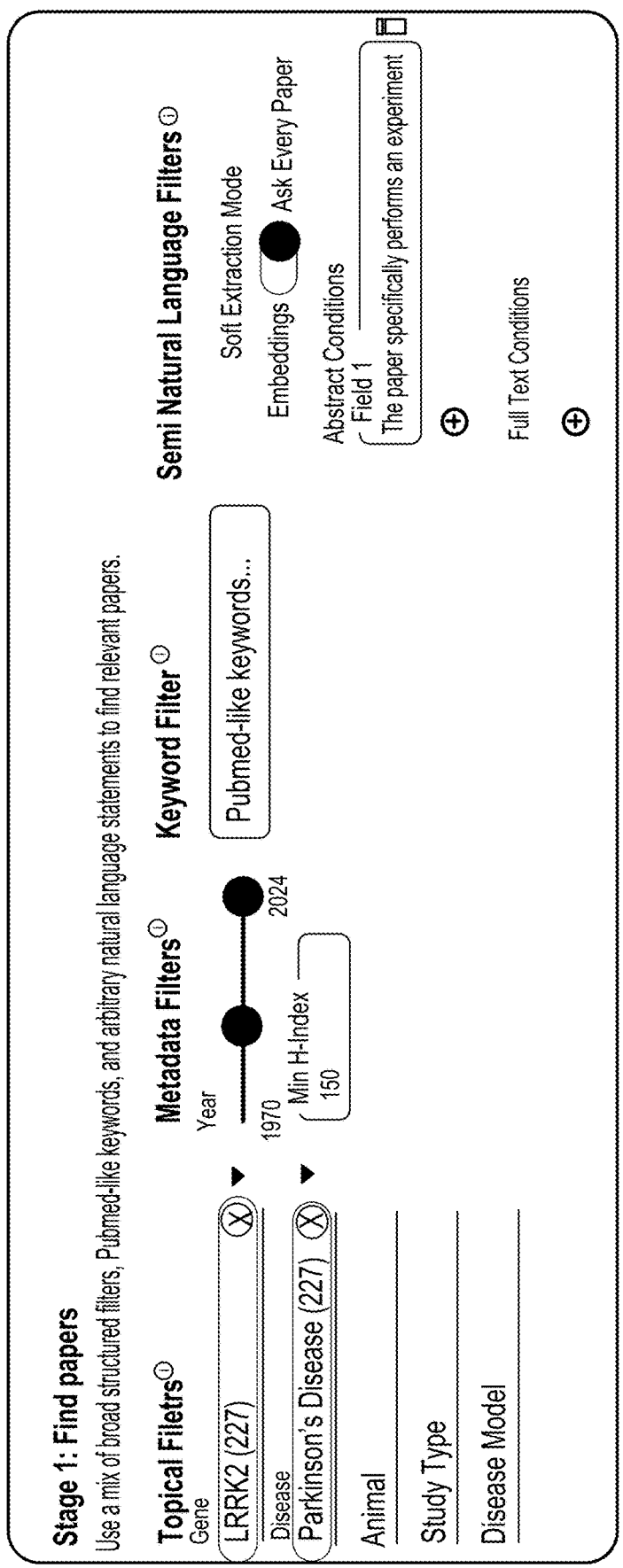

The system receives query data defining a query from a user (step 402). For example, as illustrated in FIG. 5A, the query 502 might be "How does IL-6 contribute to common neurodegenerative disease?" As another example, as illustrated in FIG. 5B, the scientific database may be a molecular biology database that stores academic research articles published in one or more molecular biology journals, and the query might be "show me all the papers about the leucine-rich repeat kinase 2 (LRRK2) gene where the authors specifically perform an experiment on mice."

In some implementations, the system receives the query data from the user through a user interface that is presented on a display of a client device. A client device typically includes applications, such as web browsers and/or native applications, to facilitate the sending and receiving of data over a network that connects the client device and the reasoning system. The web browser (or another application) of the client device can provide a user interface (e.g., a graphical user interface) to be rendered in a display of the client device for submitting queries and presenting response to the queries.

The system processes, using a language model, an input that includes the query data to generate a set of planning parameters of a plan (step 404). The plan specifies how a reasoning process can be executed to reason over the scientific database. The set of planning parameters define the specifics of such a plan. Once generated, the plan can then be executed by the reasoning system by using the language model to generate a response to the query.

The set of planning parameters can include parameters that define a filtering criterion for filtering the scientific documents stored in the scientific database to identify a smaller number of scientific documents that are relevant to the query. In the plan 504 illustrated in FIG. 5A, the filtering criteria include a first filtering criterion "studies where the paper discusses IL-6, and a second filtering criterion "studies where the paper discusses neurodegenerative disease".

The set of planning parameters can include parameters that define a set of fields or attributes to be extracted from each scientific document that has been identified to be relevant to the query. In the plan 504 illustrated in FIG. 5A, the set of fields or attributes to be extracted from the scientific document 506 that has been identified to be relevant to the query 502 includes a first field "neurodegenerative disease" and a second field "role of IL-6 in a neurodegenerative disease".

The set of planning parameters can include parameters that identify one or more fields in the set of fields based on which the scientific documents that have been identified to be relevant to the query should be clustered or grouped together.

The set of planning parameters can include parameters that define a respective summarization instruction for each document cluster in one or more document clusters.

The system executes the plan defined by the set of planning parameters (step 406). The execution of the plan involves following steps 408-414. At least some of the steps 408-414 are performed by using the language model. In this manner, the same language model is used to both generate the plan and execute the plan.

The system classifies, for each scientific document in the corpus of scientific documents stored in the scientific database, whether the scientific document is relevant to the query based on the filtering criterion that is defined by the parameters generated by the language model (step 408). In some implementations, step 408 can reduce the number of documents under consideration by greater than a threshold amount, e.g., fewer than 50%, fewer than 10%, or fewer than 1% of all scientific documents stored in the scientific database will be classified as relevant.

For example, as illustrated in FIG. 5B, the system classifies, for each scientific document in the corpus of scientific documents stored in the scientific database, whether the scientific document is relevant to the query based on the filtering criterion that "the paper specifically performs an experiment on mice". In this way only scientific documents that mention experiments performed on mice will be classified as relevant to the query. In contrast, scientific documents that mention experiments performed on human or other animals will be classified as irrelevant to the query.

The system extracts, from each scientific document that is classified as being relevant to the query, data relevant to each field in the set of fields that are defined by the parameters generated by the language model (step 410). The extracted data can include the data values for each field that appear in a relevant scientific document.

In example of FIG. 5A, the extracted data can include different data values for the "neurodegenerative disease" field that are mentioned in a relevant scientific document, i.e., different types of neurodegenerative disease mentioned in the relevant scientific document. The extracted data can also include different data values for the "role of IL-6 in a neurodegenerative disease" field that are mentioned in a relevant scientific document, i.e., different roles that IL-6 play in each of one or more neurodegenerative diseases, as mentioned in the relevant scientific document.

Figure 5C:

In example of FIG. 5C, the extracted data can include different data values for the "LRRK2 inhibition mechanism" field (as defined in the plan) that are mentioned in a relevant scientific document. In this example, the extracted data includes different mechanisms used to inhibit LRRK2: "Raf-1 kinase inhibitor I", "ATP-competitive kinase inhibitor", "staurosporine".

The system generates one or more document clusters (step 412). Generating each document cluster involves clustering a subset of the scientific documents, which have been classified as being relevant to the query, into a group based on the one or more fields defined by the parameters generated by the language model. In particular, each document cluster includes a group of scientific documents having data values for a same or similar field that corresponds to the document cluster. In some implementations, the one or more document clusters can be generated by using the language model.

For example, in the example of FIG. 5A, in accordance with the plan 504, the system can group the relevant scientific documents based on the "neurodegenerative disease" field to generate one or more document clusters that correspond respectively to different types of neurodegenerative disease. Each document cluster includes a group of scientific documents that mention the same type of neurodegenerative disease.

The system generates, for each document cluster in the one or more document clusters, a respective summary for the document cluster (step 414). A "summary" for a document cluster may be in the form of a natural language sequence that is shorter than any of the scientific document included in the document cluster but summarizes the scientific documents included in the document cluster.

In some implementations, the respective summary for the document cluster can be generated by using the language model based on processing, using the language model, an input that includes at least the respective summarization instruction for the document cluster defined by the parameters generated by the language model.

In some implementations, the respective summary for the document cluster includes, for each of one or more scientific documents included in the document cluster, a citation indicator that identifies the document. For example, the citation indicator can include information such as the author, title, edition, journal name, page, and/or publication date of a scientific document.

Merely as an example, the respective summary for each document cluster can be in the form of a passage of natural language text that includes one or more sentences. Some sentences may include a citation indicator. The inclusion of a citation indicator in a sentence indicates that at least some portion of the sentence is a verbatim or near-verbatim copy of the content that was originally included in a source scientific document.

For example, in the example of FIG. 5A, in accordance with the plan 504, the system can generate, for each document cluster that corresponds to a particular type of neurodegenerative disease, a summary for the document cluster. The summary can include natural language text that represents the most important or relevant information within the group of scientific documents included in the document cluster, e.g., that summarizes the role(s) of IL-6 in the particular type of neurodegenerative disease that corresponds to the document cluster.

Having executed the plan defined by the set of planning parameters, the system generates a response to the query (step 416). This can be done based on processing, using the language model, an input that includes at least (i) the respective summary for each document cluster in the one or more document clusters and (ii) the query, to generate an output that includes natural language text that represents the response.

For example, in the example of FIG. 5A, the response to the query "How does IL-6 contribute to common neurodegenerative disease?" can be generated based on the respective summaries for the one or more document clusters, where for each document cluster, the respective summary summarizes the role(s) of IL-6 in the particular type of neurodegenerative disease that corresponds to the document cluster.

In some implementations, much like the respective summaries for the document clusters, the response also includes one or more citation indicators. Each citation indicator can identify a source scientific document based on which a corresponding portion of the response is generated. The source scientific document can be any scientific document in the corpus of scientific documents stored in the scientific database.

Once the system has generated the response, the system can provide the response to the user. For example, in some implementations, the system can provide the response for presentation in the user interface that is presented on the display of the user device, e.g., the user device through which the user submitted the query data.

As another example, in some implementations where the system is implemented as part of or in communication with a digital assistant device, e.g., a mobile device, a smartwatch or other wearable device, or a smart speaker device, the digital assistant device can provide the response to the user, e.g., by generating speech representing the response and playing back the speech to the user over a speaker.

The reasoning system described in this specification introduces a vast technological improvement over existing solutions. For one, the reasoning system can achieve substantially improved precision and recall metrics when searching through a scientific database to identify information relevant to the query.

The improvement in precision and recall significantly improves the utility of the reasoning system, for example, to allow the reasoning system to be used e.g. for directly building and reporting tables or another real-time reasoning task that requires quickly and yet precisely identifying relevant information from a large scientific database.

For another, with respect to question answering, by performing a real-time reasoning over many scientific documents stored in a large scientific database, the reasoning system is able to generate high quality answers by taking into account large amounts of information from different sources and drawing meaningful conclusions from the identified, relevant information.

This is in contrast to existing solutions that do not involve a reasoning process guided by the outputs of a language model.

For example, in response to the same example query "show me all the papers about the leucine-rich repeat kinase 2 (LRRK2) gene where the authors specifically perform an experiment on mice," a search engine would return a list of search results that identify papers related to "LRRK2" or "mice," but potentially including papers about LRRK2 that merely mention mice in their motivation section, or papers merely about mice that discuss LRRK2, but not the specific details the user desires.

As another example, in response to the same example query, a retrieval-augmented generation system may obtain a set of search results using a search engine, where each search result identifies a respective scientific document, and then incorporate the search results into a prompt before processing the prompt using a neural network to generate a response. However, due to the limitations of the search results mentioned above, the set of search results may represent a very limited sampling of all of the information that is available in the scientific database i.e., unlike the reasoning process executed by the reasoning system that can extract data by more thoroughly reasoning over the scientific database. Expert users commonly find issues when presented with answers that have been generated by those systems on the basis of such search results.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving query data defining a query from a user;
   processing a network input that comprises the query data, using a language model neural network, to generate a set of planning parameters of plan to be executed by the language model neural network to generate a response to the query from the user, wherein the set of planning parameters define at least:
   (i) a natural language filtering criterion for filtering a set of documents to identify documents relevant to the query; and
   (ii) a set of natural language fields to be extracted from each document that has been identified to be relevant to the query, wherein each natural language field in the set of natural language fields is expressed in a natural language;
   executing the plan defined by the set of planning parameters generated by the language model neural network, comprising:
   performing a classification operation that comprises classifying, for each document in a set of documents, whether the document is relevant to the query by processing a network input comprising:
   (i) the document, and (ii) the natural language filtering criterion previously generated by the language model neural network, using the language model neural network to generate a network output that classifies whether the document is relevant to the query; and
   performing an extraction operation that comprises extracting, from each document that is classified as being relevant to the query, natural language data from the document that is relevant to each natural language field in the set of natural language fields generated by the language model neural network; and
   wherein latency is reduced and computational efficiency is increased during execution of the plan by:
   (a) partitioning the set of documents into a plurality of document subsets, and
   (b) assigning each document subset to a respective computing unit in a collection of computing units, wherein each computing unit operates independently and in parallel with the other computing units and performs classification operations and extraction operations on the document subset assigned to the computing unit; and generating, using the language model neural network, and based on the data extracted from the documents classified as being relevant to the query, a response to the query.

2. The method of claim 1, wherein the set of documents are stored in a knowledge base external to the language model neural network.

3. The method of claim 1, wherein the set of planning parameters identifies one or more natural language fields in the set of natural language fields based on which documents that have been identified to be relevant to the query should be clustered; and
   wherein executing the plan defined by the set of planning parameters further comprises:
   generating one or more document clusters each comprising one or more documents based on one or more defined natural language fields.

4. The method of claim 3, wherein generating the one or more document clusters comprises generating the one or more document clusters using the language model neural network.

5. The method of claim 3, wherein the set of planning parameters define a respective summarization instruction for each document cluster in the one or more document clusters; and
   wherein executing the plan defined by the set of planning parameters further comprises:
   generating, using the language model neural network and for each document cluster in the one or more document clusters, a respective summary for the document cluster based on processing the respective summarization instruction for the document cluster and at least a portion of each of the one or more documents included in the document cluster.

6. The method of claim 5, wherein generating, using the language model neural network and for each document cluster in the one or more document clusters, the respective summary for the document cluster comprises processing, by the language model neural network, the data extracted from each document included in the document cluster.

7. The method of claim 5, wherein the respective summary for the document cluster includes, for each of one or more documents included in the document cluster, a citation indicator that identifies the document.

8. The method of claim 5, wherein generating the response to the query comprises processing, by the language model neural network, the respective summary for each document cluster in the one or more document clusters.

9. The method of claim 1, wherein receiving the query data defining the query from the user comprise receiving the query from the user and by way of a user interface presented to the user on a display of a user device, and wherein the method further comprises:
   presenting, by way of the user interface and on the display of the user device, the response to the query.

10. A system comprising one or more computers and one or more storage devices storing instructions that, when executed by the one or more computers, cause the one or more computers to perform operations comprising:
    receiving query data defining a query from a user;
    processing a network input that comprises the query data, using a language model neural network, to generate a set of planning parameters of plan to be executed by the language model neural network to generate a response to the query from the user, wherein the set of planning parameters define at least:

(i) a natural language filtering criterion for filtering a set of documents to identify documents relevant to the query; and (ii) a set of natural language fields to be extracted from each document that has been identified to be relevant to the query, wherein each natural language field in the set of natural language fields is expressed in a natural language;

executing the plan defined by the set of planning parameters generated by the language model neural network, comprising:

performing a classification operation that comprises classifying, for each document in a set of documents, whether the document is relevant to the query by processing a network input comprising:

(i) the document, and (ii) the natural language filtering criterion previously generated by the language model neural network, using the language model neural network to generate a network output that classifies whether the document is relevant to the query; and performing an extraction operation that comprises extracting, from each document that is classified as being relevant to the query, natural language data from the document that is relevant to each natural language field in the set of natural language fields generated by the language model neural network; and wherein latency is reduced and computational efficiency is increased during execution of the plan by:

(a) partitioning the set of documents into a plurality of document subsets, and (b) assigning each document subset to a respective computing unit in a collection of computing units, wherein each computing unit operates independently and in parallel with the other computing units and performs classification operations and extraction operations on the document subset assigned to the computing unit; and generating, using the language model neural network, and based on the data extracted from the documents classified as being relevant to the query, a response to the query.

11. The system of claim 10, wherein the set of documents are stored in a knowledge base external to the language model neural network.

12. The system of claim 10, wherein the set of planning parameters identifies one or more natural language fields in the set of natural language fields based on which documents that have been identified to be relevant to the query should be clustered; and wherein executing the plan defined by the set of planning parameters further comprises:

generating one or more document clusters each comprising one or more documents based on one or more defined natural language fields.

13. The system of claim 12, wherein generating the one or more document clusters comprises generating the one or more document clusters using the language model neural network.

14. The system of claim 12, wherein the set of planning parameters define a respective summarization instruction for each document cluster in the one or more document clusters; and wherein executing the plan defined by the set of planning parameters further comprises:

generating, using the language model neural network and for each document cluster in the one or more document clusters, a respective summary for the document cluster based on processing the respective summarization instruction for the document cluster and at least a portion of each of the one or more documents included in the document cluster.

15. The system of claim 14, wherein generating, using the language model neural network and for each document cluster in the one or more document clusters, the respective summary for the document cluster comprises processing, by the language model neural network, the data extracted from each document included in the document cluster.

16. The system of claim 14, wherein the respective summary for the document cluster includes, for each of one or more documents included in the document cluster, a citation indicator that identifies the document.

17. The system of claim 14, wherein generating the response to the query comprises processing, by the language model neural network, the respective summary for each document cluster in the one or more document clusters.

18. The system of claim 10, wherein receiving the query data defining the query from the user comprise receiving the query from the user and by way of a user interface presented to the user on a display of a user device, and wherein the operations further comprises:

presenting, by way of the user interface and on the display of the user device, the response to the query.

19. One or more non-transitory computer storage media storing instructions that, when executed by one or more computers, cause the one or more computers to perform operations comprising:

receiving query data defining a query from a user;

processing a network input that comprises the query data, using a language model neural network, to generate a set of planning parameters of plan to be executed by the language model neural network to generate a response to the query from the user, wherein the set of planning parameters define at least:

(i) a natural language filtering criterion for filtering a set of documents to identify documents relevant to the query; and (ii) a set of natural language fields to be extracted from each document that has been identified to be relevant to the query, wherein each natural language field in the set of natural language fields is expressed in a natural language;

executing the plan defined by the set of planning parameters generated by the language model neural network, comprising:

performing a classification operation that comprises classifying, for each document in a set of documents, whether the document is relevant to the query by processing a network input comprising:

(i) the document, and (ii) the natural language filtering criterion previously generated by the language model neural network, using the language model neural network to generate a network output that classifies whether the document is relevant to the query; and performing an extraction operation that comprises extracting, from each document that is classified as being relevant to the query, natural language data from the document that is relevant to each natural language field in the set of natural language fields generated by the language model neural network; and wherein latency is reduced and computational efficiency is increased during execution of the plan by:

(a) partitioning the set of documents into a plurality of document subsets, and (b) assigning each document subset to a respective computing unit in a collection of computing units, wherein each computing unit operates independently and in parallel with the other computing units and performs classification operations and extraction operations on the document subset assigned to the computing unit; and generating, using the language model neural network, and based on the data extracted from the documents classified as being relevant to the query, a response to the query.

20. The non-transitory computer storage media of claim 19, wherein the set of planning parameters identifies one or more natural language fields in the set of natural language fields based on which documents that have been identified to be relevant to the query should be clustered; and wherein executing the plan defined by the set of planning parameters further comprises:
generating one or more document clusters each comprising one or more documents based on one or more defined natural language fields.

* * * * *